(12) United States Patent  (10) Patent No.: US 8,866,663 B2
Aharony et al.  (45) Date of Patent: Oct. 21, 2014

(54) METHODS AND APPARATUS FOR SENSING ORGANIC TISSUE

(75) Inventors: Nadav Aharony, Cambridge, MA (US); Michael Siegel, Hidden Hills, CA (US)

(73) Assignee: Massachusetts Institute of Technology, Cambridge, MA (US)

(\*) Notice: Subject to any disclaimer, the term of this patent is extended or adjusted under 35 U.S.C. 154(b) by 430 days.

(21) Appl. No.: 13/337,472

(22) Filed: Dec. 27, 2011

(65) Prior Publication Data

US 2013/0162459 A1  Jun. 27, 2013

(51) Int. Cl.
*G01S 13/06* (2006.01)
*G01S 13/00* (2006.01)
*G01S 13/04* (2006.01)

(52) U.S. Cl.
CPC .............. *G01S 13/003* (2013.01); *G01S 13/04* (2013.01)
USPC ............... 342/27; 342/28; 342/114; 342/107; 342/146

(58) Field of Classification Search
CPC ................. G06K 2017/0045; G01S 2013/466; G01S 13/003; G01S 13/04; G01S 13/06; G01S 13/876; G01S 13/878
USPC ............ 342/27–28, 107, 109, 113–114, 133, 342/139, 146–147
See application file for complete search history.

(56) References Cited

U.S. PATENT DOCUMENTS

| | | | | |
|---|---|---|---|---|
| 4,361,202 A * | 11/1982 | Minovitch | ............... | 180/168 |
| 5,661,457 A * | 8/1997 | Ghaffari et al. | ............ | 340/572.7 |
| 6,114,957 A * | 9/2000 | Westrick et al. | ........... | 340/568.1 |
| 6,927,573 B2 * | 8/2005 | Eberler et al. | ................ | 324/309 |
| 6,958,677 B1 * | 10/2005 | Carter | .......................... | 340/10.1 |
| 7,091,827 B2 * | 8/2006 | Stilp | ............................. | 340/10.1 |
| 7,468,689 B2 * | 12/2008 | Ma et al. | ....................... | 342/146 |
| 7,800,496 B2 * | 9/2010 | Albert et al. | .................. | 340/541 |
| 8,248,210 B2 * | 8/2012 | Nikitin et al. | ................ | 340/10.1 |
| 8,446,254 B2 * | 5/2013 | Carrick et al. | ............... | 340/10.1 |
| 8,542,109 B2 * | 9/2013 | Butler et al. | .................. | 340/522 |
| 2006/0033609 A1 * | 2/2006 | Bridgelall | ................. | 340/10.42 |
| 2006/0164240 A1 * | 7/2006 | Patchell | ........................ | 340/552 |
| 2008/0007404 A1 * | 1/2008 | Albert et al. | .................. | 340/552 |
| 2008/0309452 A1 * | 12/2008 | Zeine | ............................ | 340/5.1 |

(Continued)

OTHER PUBLICATIONS

K. Woyach, D. Puccinelli, M. Haenggi, Sensorless Sensing in Wireless Networks: Implementation and Measurements; in 4th International Symposium on Modeling and Optimimization in Mobile, Ad Hoc and Wireless Networks, pp. 1-8, Apr. 2006.

(Continued)

*Primary Examiner* — John B Sotomayor
(74) *Attorney, Agent, or Firm* — Stephen R. Otis (57) ABSTRACT

In exemplary implementations of this invention, a radio signal is transmitted between a transmitter and a receiver. Either the transmitter, or receiver, or both, have a directional antenna. When organic tissue passes between (or is stationary between) the transmitter and receiver, the tissue causes a reduction of the received signal strength (RSS) of the signal, as compared to a baseline RSS. The larger the amount of tissue, the greater is the reduction of the RSS. By analyzing the degradation of the signal, information about organic tissue between the transmitter and receiver may be determined. For example, the number of persons passing through a physical threshold may be determined. Or the fact that one person is walking faster than, and catching up with, a second person as they pass between the transmitter and receiver may be determined.

20 Claims, 10 Drawing Sheets

MORE TISSUE = MORE SIGNAL LOSS

(56) References Cited

U.S. PATENT DOCUMENTS

| | | | |
|---|---|---|---|
| 2008/0315540 A1* | 12/2008 | Hannah et al. | 280/33.994 |
| 2009/0315759 A1* | 12/2009 | Mak et al. | 342/147 |
| 2010/0066500 A1* | 3/2010 | Ljungstrom et al. | 340/10.1 |
| 2010/0109844 A1* | 5/2010 | Carrick et al. | 340/10.1 |
| 2011/0062334 A1* | 3/2011 | Ben-Bassat | 250/332 |
| 2011/0169617 A1* | 7/2011 | Spindel et al. | 340/10.32 |
| 2011/0315765 A1* | 12/2011 | Schantz et al. | 235/385 |
| 2012/0319822 A1* | 12/2012 | Hansen | 340/10.1 |
| 2013/0162459 A1* | 6/2013 | Aharony et al. | 342/27 |

OTHER PUBLICATIONS

J. Wilson, N. Patwari, Radio Tomographic Imaging with Wireless Networks, in IEEE Transactions on Mobile Computing, vol. 9, issue 5, pp. 621-632, Jan. 2010.

J. Wilson, N. Patwari, Through-Wall Motion Tracking Using Variance-Based Radio Tomography Networks, Arxiv preprint arXiv:0909.5417v2 [cs.OH] Oct. 1, 2009; publisher: Cornell University Library, arXiv.org.

\* cited by examiner

FIG. 1

MORE TISSUE = MORE SIGNAL LOSS

METHODS AND APPARATUS FOR SENSING ORGANIC TISSUE

FIELD OF THE TECHNOLOGY

The present invention relates generally to sensors for detecting organic tissue, including sensors for tracking or counting the number of people crossing a threshold.

SUMMARY

In exemplary implementations of this invention, a radio signal with a frequency of about 2.4 GHz is transmitted between a transmitter and a receiver. Either the transmitter, or receiver, or both, have a directional antenna. When organic tissue passes between (or is stationary between) the transmitter and receiver, the tissue causes a reduction of the received signal strength (RSS) of the signal, as compared to a baseline RSS. The larger the amount of tissue, the greater is the reduction of the RSS.

By analyzing the degradation of the signal, information about organic tissue positioned between the transmitter and receiver may be determined. For example, the number of persons passing through a physical threshold may be determined. Or, for example, the fact that one person is walking faster than, and catching up with, a second person s they pass between the transmitter and receiver may be determined.

It was known in the past that radio signals in the 2.4 GHz range may be attenuated by the presence of persons in the vicinity of the signal. Using prior technology, it was possible to measure degradation of the signal to detect general human motion in the vicinity of the signal. However, radio signals in this frequency range are noisy and unpredictable (they bounce or scatter off of some objects in the environment, and pass through others, causing the radio signals to travel in unpredictable paths). Due to this noisiness and unpredictability, it was not possible, using prior technology, to map interference to bodies in a specific location or to bodies crossing a specific physical threshold.

In exemplary implementations, the present invention solves this problem (of the noisiness and unpredictability of the signal) by using at least one directional antenna. That is, either the transmitter, the receiver, or both, have a directional antenna. By using at least one directional antenna, interference from unwanted sources is greatly reduced.

In some implementations, multiple receivers and/or multiple transmitters are employed. For example, a single omnidirectional transmitter may be used with multiple directional receivers. Or, for example, multiple directional transmitters may be positioned across from multiple directional receivers on opposite sides of a rectangular area, so that the signal from each directional transmitter is pointed toward only one of the directional receivers, respectively. This arrangement of the transmitters and receivers creates a grid of radio signals in an area, thereby allowing the position and motion of multiple persons in that area to be determined.

In an illustrative implementation, this invention is adapted to count the number of persons passing through a physical threshold. The antenna of a single directional transmitter and the antenna of a single directional receiver are each positioned at a height of 110 cm (i.e., between waist height and shoulder height for a typical human adult), approximately 3 meters apart.

In exemplary implementations, this invention uses a high frequency radio wave that is partially absorbed or scattered by organic tissue it passes through. This phenomenon (partial absorption or partial scattering) is used to provide gradient data (how much organic tissue is present) rather than merely binary data (whether or not an obstruction is present).

In exemplary implementations: The sensor uses RF at standard communications frequencies (e.g., 2.4 GHz), and thus can easily double as a communications device, reporting sensor data to a remote location. The system can make use of existing RF communication chipsets, e.g. Bluetooth®, Wireless LAN (IEEE 802.11, ZigBee® (IEEE 802.15), and others. It can also make use of existing consumer devices with little modification. The system can be calibrated for counting human beings, or other types of animals such as livestock. Low power operation, rapid deployment, and imperviousness to light and outdoor temperatures make this technology suitable to a wide range of applications.

The above description of the present invention is just a summary. It is intended only to give a general introduction to some illustrative implementations of this invention. It does not describe all of the details of this invention. This invention may be implemented in many other ways.

The above Figures show some non-limiting examples of this invention, or provide information that relates to those examples. The above Figures do not show all of the details of this invention.

DETAILED DESCRIPTION

In exemplary implementations of this invention, RF (radio frequency) signal transmission and pattern recognition algorithms are used to count the number of people crossing a predefined physical threshold (or to detect their presence or motion). Because the RF signal is only partially absorbed by humans, it is possible to count the number of people simultaneously crossing the threshold. By measuring the signal strength at a receiver, an estimate can be made as to the number of people blocking the RF beam of a transmitter at a given moment. By analyzing the signal patterns, abnormal behavior, such as an individual stopping in front of the beam for an extended period, while others pass by, can be characterized. This is useful in cases where potentially large and unordered crowds entering and exiting a space between defined boundaries need to be accurately counted.

Different configurations of RF receivers and transmitters can be set up to define the measured physical space. Any direct wireless link between a receiver and a transmitter's signal can act as a physical threshold for sensor measurements. This threshold is created by a high directionality property of the received signal. The RF signal reception can be made directional by using directional beam forming techniques at the sender side, the receiver side, or on both transmitter and receiver sides (for increased directionality, range, and/or accuracy). This directionality is also used to greatly reduce multipath and interference effects commonly associated with signals in the RF spectrum.

Because there is a direct correlation between the RF signal degradation and the amount of organic tissue mass through which it passes, it is possible to count the number of people simultaneously crossing the threshold. By measuring features such as the received signal strength at a receiver device, an estimate can be made as to the number of people blocking the RF beam of a transmitter at a given moment.

In some implementations, the sensor can double as a communications device, reporting traffic data to a remote location. For example, 2.4 GHz radio transmissions may be used for both detection of organic tissue and for communication to a remote device. Alternately, other frequencies may be used instead. In some embodiments, the frequency(cies) used for detection of organic tissue may be different than the frequency(cies) used for communication with remote devices.

In exemplary implementations, the invention is calibrated for counting human beings. Alternately, it may be configured to detect and count other types of living creatures, such as livestock.

In some implementations, this invention uses an RF transmitter, receiver, and computer configured in such a way that any change in signal strength at the receiver is detected in real time by the computer. The transmitter and receiver are positioned so that any organic tissue passing between them partially obstructs the signal, thus decreasing the signal strength. A computer monitors the signal strength reported by the receiver, and uses a series of algorithms to clean and classify the data. In real time, this system can accurately count the number of bodies passing between the transmitter and receiver.

The transmitter may use a compact directional antenna aimed at the receiver to maximize the power of the unobstructed signal. The receiver need not use a directional antenna. However, a directional receiver antenna may increase the reliability of the system over long distances.

In exemplary implementations, the transmitter emits signals in the RF microwave frequency range (i.e., between 0.3 GHz and 300 GHz). For example, a prototype uses signals in the 2.4 GHz unlicensed spectrum range. However, other microwave frequencies may be used instead (for example 900 MHz, 5 GHz, etc.). In some implementations, a 2.4 GHz or 5 GHz range used by the IEEE 802.11, Bluetooth, or IEEE 802.15 standards is employed.

Preferably, the strength of the transmitted signal is strong enough that the signal strength decreases in a measurable way as the "thickness" of obstruction increases, up to the maximum measurable thickness. Beyond this threshold, the signal will be completely absorbed or deflected by the obstructing objects, and will not reach the receiver. Beyond the allowable thickness, the system effectively acts as a "binary" sensor that can detect if there is an obstruction or not, but is not able to give any deeper gradient information. Distance between receiver and transmitter, antenna design, signal shape, and maximum anticipated obstruction size are all factors in determining the necessary signal strength. Testing of the prototypes has shown that very low power FCC approved transmitters used in portable devices are able to provide more than enough signal strength for people counting applications.

Figure 1:
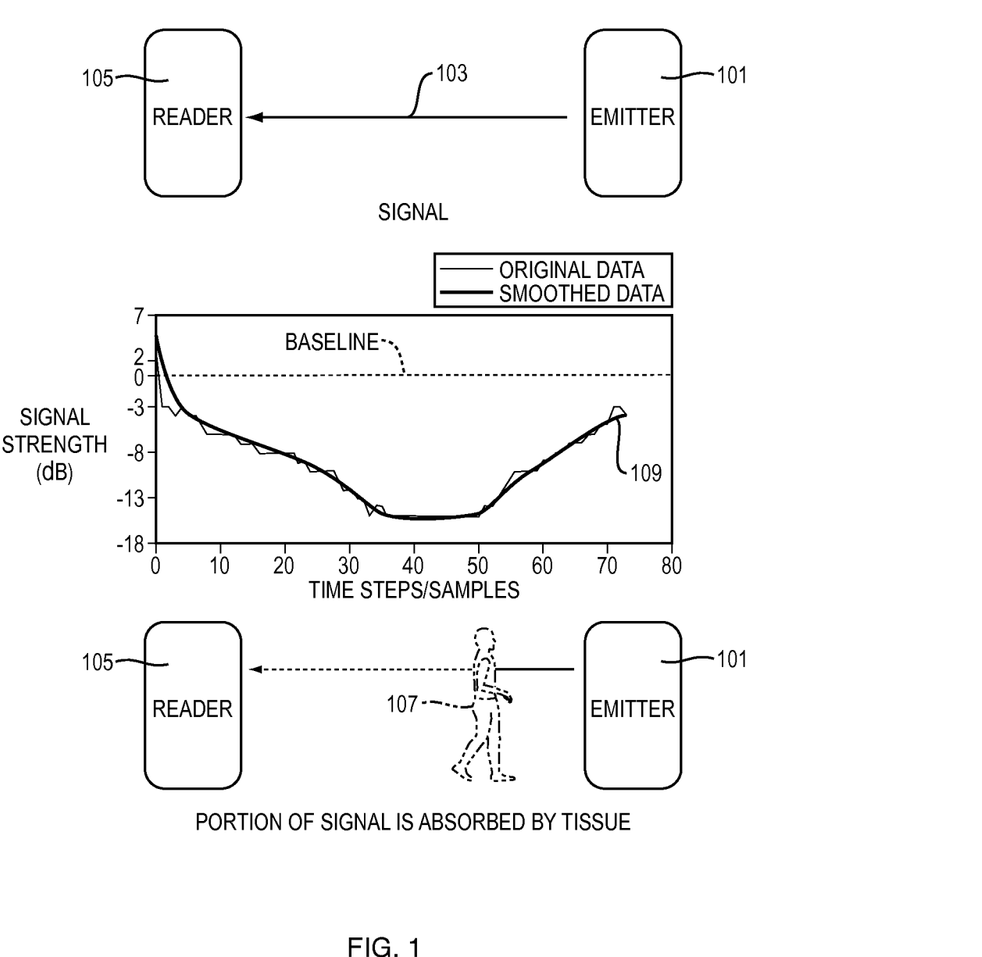
FIG. 1 shows a reduction in signal strength due to one person passing between the emitter and reader.
Figure 2:
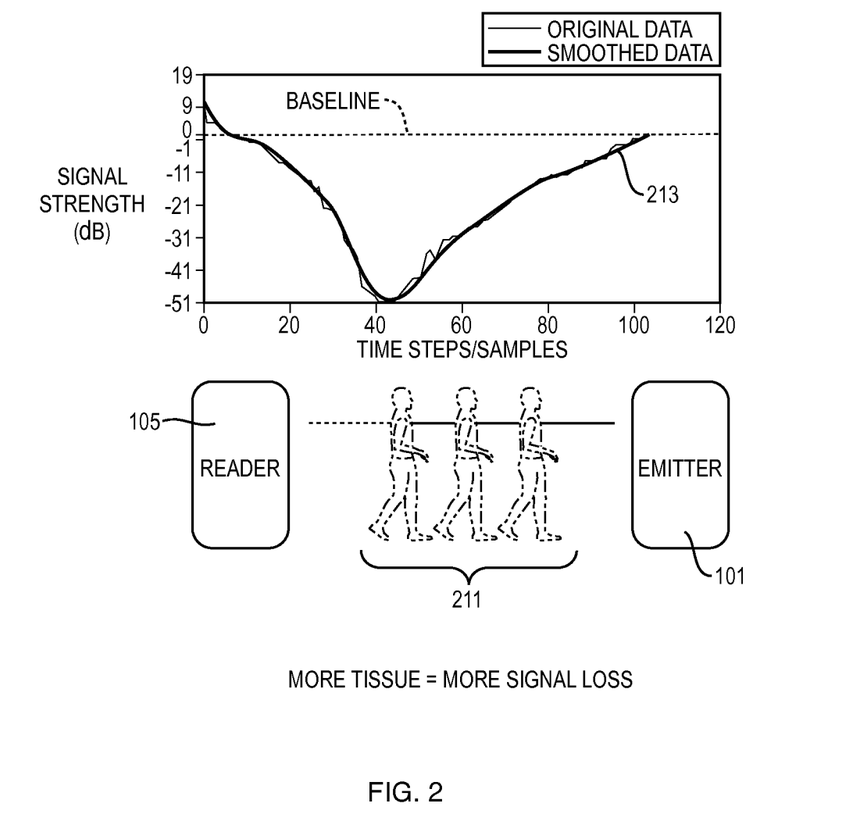
FIG. 2 shows a greater reduction in signal strength due to three persons passing between the emitter and reader.

FIGS. 1 and 2 show how different amounts of organic tissue cause different amounts of reduction in received signal strength (RSS), in an exemplary implementation of this invention. In FIG. 1, an emitter antenna 101 transmits a radio signal 103 to a reader antenna 105. A person 107 walks between the emitter and reader, partially obstructing the signal. This causes the RSS of the signal to fall below a baseline amount. Similarly, in FIG. 2, the emitter antenna 101 transmits a radio signal to the reader antenna 105. This time, multiple persons 211 (rather than just one person) walk between the emitter and reader, partially obstructing the signal. This causes the RSS 213 of the signal to fall below a baseline amount. The more people (and thus the more organic tissue) that pass between the emitter and reader, the more signal loss. (In the charts in FIGS. 1 and 2, respectively, RSS is plotted as curves 109, 213).

The transmitted signal does not have to be continuous in time, but can be composed of periodic bursts. These bursts can be standard data packets, such as "ping" or "keep-alive" packets that are commonly used in data communication standards. The frequency of the packet bursts can be configured according to standard sampling methodologies, such as Nyquist-Shannon Sampling Theorem. If the receiver is constantly on (or synced with transmission frequency), the transmitted packet rate constitutes the system's sampling rate. The receiver preferably can measure signal strength at a rate fast enough to detect the small space between individuals walking in close succession. The packet transmission rate will determine the maximal speed of a detectable moving obstruction, its size, and characteristics such as minimal separable distance between successive obstructions entering the measured area. Also, a high sampling rate may allow for the characterization of some aspects of the body's shape and behavior, including size, speed and direction. The interactions between the RF signal and different bodily materials such as bone or flesh are distinguishable. For example, the characteristic signal behavior when a person passes across the sensor with a directional beam shows a distinct drop in signal strength most likely associated with the spine.

An individual's speed can be determined by the number of signal bursts associated with the characteristic drop in signal strength when a moving person crosses the sensed area. Because the sampling rate of the system is constant and known, the greater the number of bursts passing through the spine, the slower the individual would be moving. Also, because the ratio of the size of the human spine and the size of the rest of the human body is relatively similar, the size of a human can also be extrapolated.

The RSS can also indicate whether a person is skinny or obese: The total degradation of the signal caused by a skinny person will be less than an obese person, if the speed at which they are moving is the same. (Speed can be determined as described above).

In a dual directional antenna embodiment, the antennas are preferably positioned facing each other. In prototypes, they were positioned between 90 cm and 140 cm above the floor (i.e., above waist height and below shoulder height for a typical human adult) such as to avoid potential confusion caused by legs. The distance between the antennas can be varied, and may be designed to suit the application and deployment scenarios. For example, the antennas may be only a close distance apart, such as on either side of a doorway. Alternately, the antennas may be a large distance apart.

In exemplary implementations, the control of the transmitter and receiver is very simple, requiring only a low power microcontroller. On the transmitter end, the microcontroller sends data packets at a constant rate. The receiver receives packets sent by the transmitter. The signal strength of each packet is measured and passed on for analysis by a processing unit. This signal strength is either directly measured by the receiver circuit in raw form (signal strength of reception), or based on existing signal strength values that are part of the radio chipset or communication standard (e.g. WiFi's RSSI values).

The connection between the receiver unit and the processing unit can be implemented in multiple ways, depending on the location of the processing unit with relation to the receiver.

Figure 3:
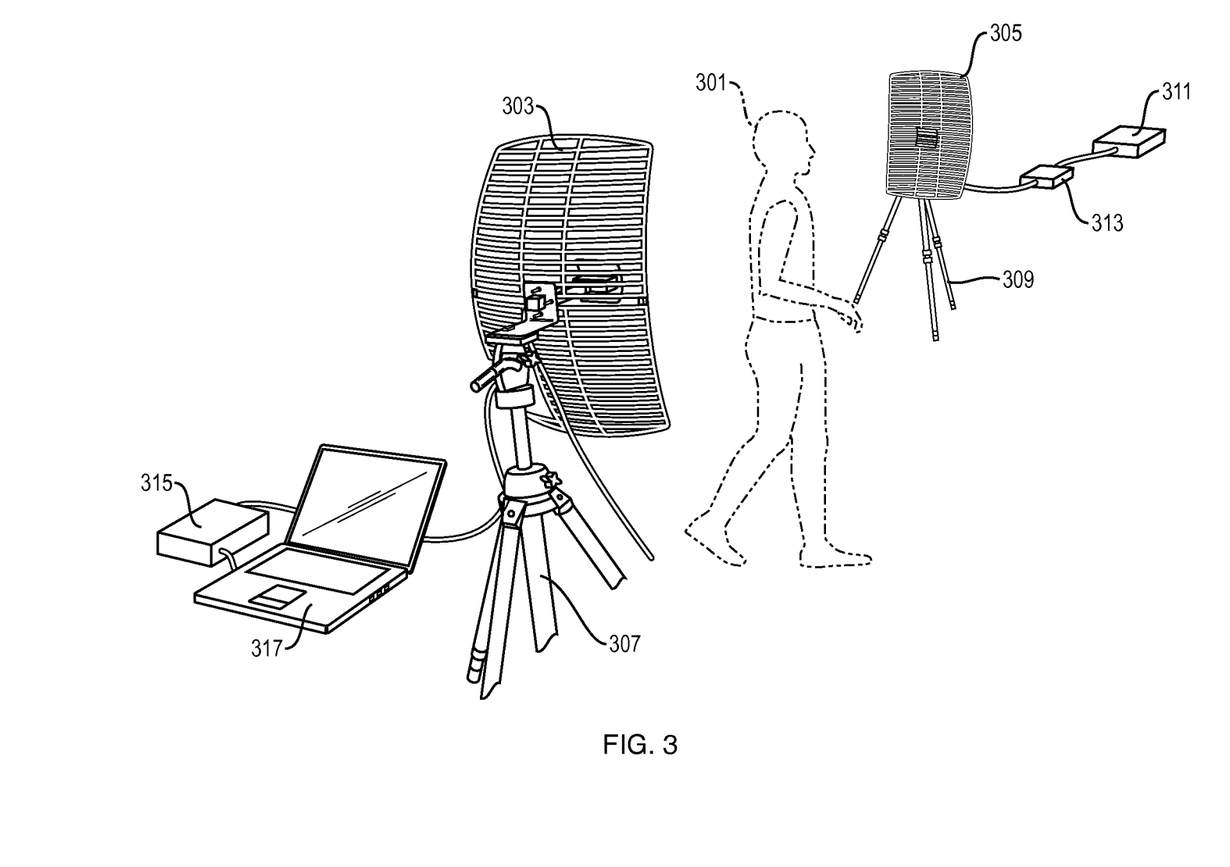
FIG. 3 shows a prototype of this invention, with two directional antennas.

In some implementations, the processing unit is physically near the receiver. For example, the processing unit can be either located in the same housing and physical board, or it can be in an external device, such as a personal computer (PC) connected to the receiver device via some standard communication protocol such as USB or serial. In this case the receiver device uses additional hardware that supports this communication standard. FIG. 3 illustrates an example of such a configuration. In FIG. 3, a person 301 walks between an emitter antenna 305 and a receiver antenna 303. Both of these are directional antennas. They are mounted on tripods 307, 309, respectively, at a height above the floor such that the directional signal is transmitted above the waist level, and below the shoulder level, of the person 301. Signals from a transmitter board 311 are attenuated by an attenuator 313, before being transmitted by directional antenna 305. Signals received by directional antenna 303 are processed by a receiver board 315, which is connected by a USB cable to a laptop computer 317. Software installed on the laptop computer performs the detection algorithm, among other things.

Alternately, in some implementations, the processor is physically remote from the receiver. In some cases, the receiver unit includes another transmitter to relay the data onward to the processing unit. In some cases, the receiving transceiver is used in a coupled manner and alternates between receiving the polling, or "ping", packet, and transmitting the received signal strength to the processing unit.

If the processing unit is in physical proximity to the transmitter unit, its transceiver can be used to receive the detected signal strength and pass it on to the processing unit as described in the previous case. In that case, both the receiver and transmit units may alternate receiving and sending, and each data packet sent from the "remote" transceiver may contain the signal strength of the one last received.

Figure 4:
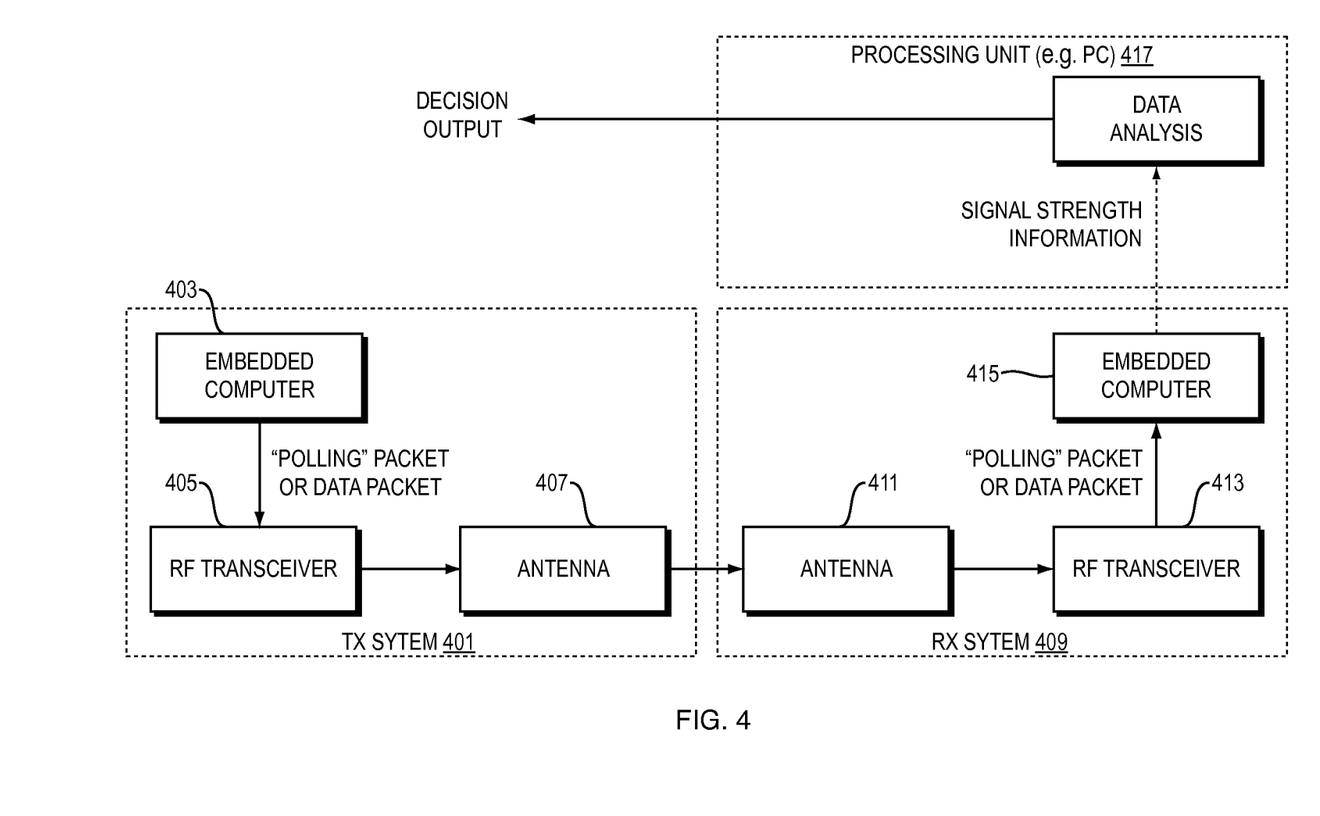
FIG. 4 is a block diagram of high level functional architecture, in an exemplary implementation of this invention.

FIG. 4 is a block diagram of high level functionality, in an example of this invention where the processor is in physical proximity to the transmitter unit. In this example: A transmitter system 401 comprises an embedded computer 403, RF (radio frequency) transceiver 405 and antenna 407 for transmitting "polling data" or data packets. A receiver system 409 comprises an antenna 411, RF transceiver 413 and embedded computer 415 for receiving the "polling" packet or data packet. The receiver system 409 relays the data onward to a processing unit (e.g., personal computer) 417 for data analysis to determine signal strength and output a decision.

Alternately, an omnidirectional receiver may transmit to an omnidirectional base-station that aggregates data from multiple sensor antenna pairs to a single processing unit.

When signals in the desired frequency range encounter an object, some part of the signal might pass through the object, some might be reflected off the object, and some part might be absorbed by the object. These properties differ between materials and object compositions. These properties, particularly the tendency of these signals to bounce off some walls and pass through others, makes this frequency range hard to deal with and predict. The most commonly used form of antenna is an omnidirectional one, which causes a signal to bounce of walls and other objects and create patterns that are hard to predict. Similarly, when using an omnidirectional receiver, it is hard to predict the physical paths through which the incoming signals have traversed.

For these reasons, even though it had been known that the presence of people in the area of signals in the 2.4 GHz range had attenuated the signals, it was considered very hard, if not impossible, to create a sensor system targeted at mapping the interference to a specific location or linear threshold that had been crossed (When starting to work on this project, the inventors were discouraged by experts who said this could not be done because of the unpredictability and noisiness of these types of signals. These experts were genuinely surprised when this succeeded.)

According to principles of this invention, directional antennas may be used to solve this problem. The antennas can make the signal much cleaner and predictable. The signal-shaping done by the directional antennas may be used to define the physical boundaries of detection and limit the interrupting reflections.

Even in a deployment with a single receiver and a single transmitter, a variety of antenna deployment configurations may be used. In one case, both transceivers use directional antennas. In two other cases, one of the transceiver uses directional antennas, and the other uses omnidirectional antennas.

Figure 5A:
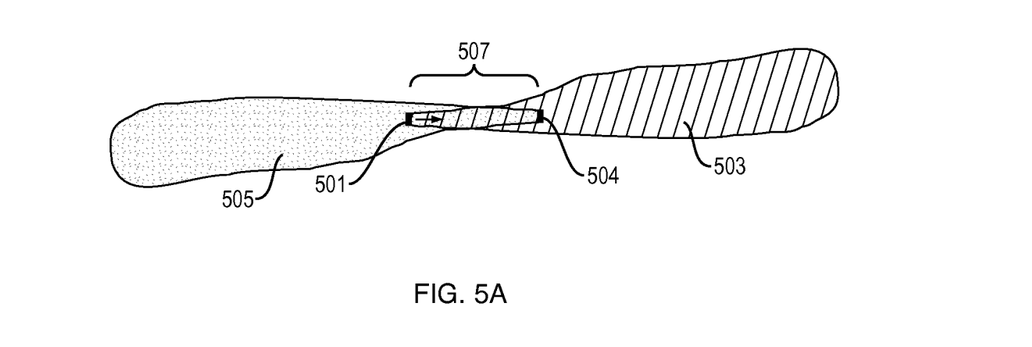
FIG. 5A shows the overlap between receiver/transmitter signal paths, in an example where both the receiver and transmitter antennas are directional.
Figure 5B:
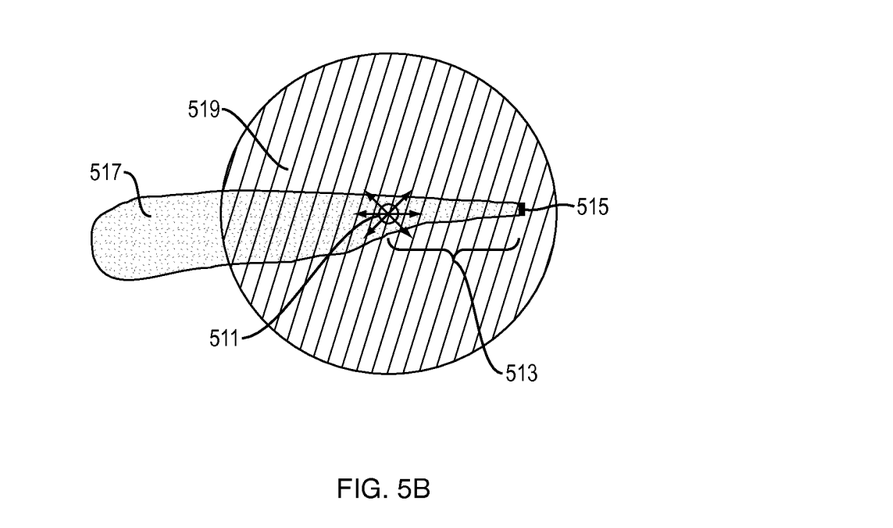
FIG. 5B shows the overlap between receiver/transmitter signal paths, in an example where the transmitter antenna is omnidirectional and the receiver antenna is directional.

FIG. 5A and FIG. 5B show examples of antenna configurations that may be used for a single transmitter/single receiver deployment. In FIG. 5A, both the transmitter antenna 501 and receiver antenna 504 are directional. The transmitter path 503 and the receiver path 505 overlap in an active sensing area 507. In FIG. 5B, the transmitter antenna 511 is omnidirectional and the receiver antenna 515 is directional. The transmitter path 519 and receiver path 517 overlap in an active sensing area 513.

In a prototype of this invention, a 12 degree beamwidth antenna is used for both the receiver and transmitter sides. However, many other beam widths may be used. The combination of the two antenna beam form factors affects the operational parameters of the sensor (e.g. maximum distance for accurate readings, the form of the physical detection threshold, etc.).

Figure 6:
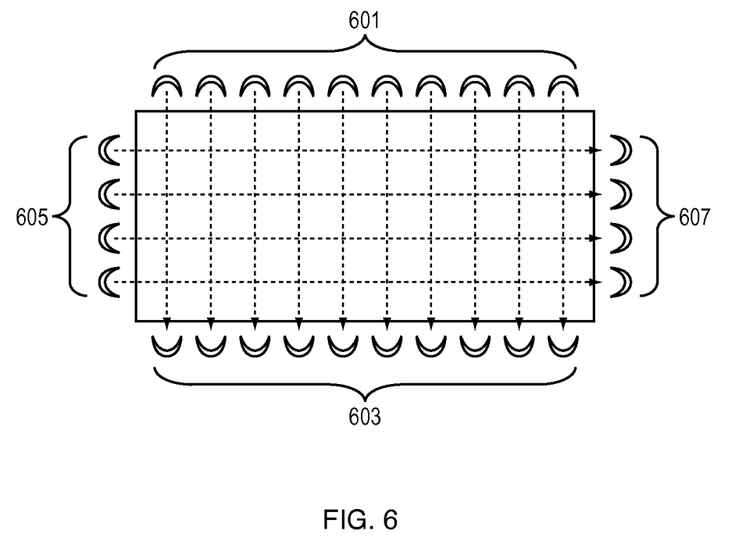
FIG. 6 shows a grid of radio signals formed by multiple directional transmitters and multiple directional receivers.

Alternately, more complex antenna layouts may be used, that would allow different applications. For example, FIG. 6 shows a grid of receivers and transmitters, in an illustrative embodiment of this invention. In FIG. 6, sets of directional transmitter antennas 601, 605 are positioned opposite sets of directional receiver antennas 603, 607; with each of the transmitter antennas aimed at one of the receiver antennas, respectively. Such a grid may be used for indoor location tracking In that case, the antennas may be inside a room, embedded in the walls, or even outside (for walls made of material that is permeable to the RF signals, like wood or drywall). In FIG. 6, the sets of transmitting and receiver antennas are aligned opposite each other on the perimeter of a rectangular area. Alternately, other configurations may be used to create a pattern of intersecting directional radio signals, which may or may not be orthogonal to each other. For example, a diagonal pattern or radial pattern of directional radio signals may be used.

By using a signal grid (such as the example shown in FIG. 6) and algorithms for pairwise person sensing and counting for each pair of transmitter-receiver, and integration of the results of each pairwise output, a detailed real-time map of multi-person movement through a predefined space may be constructed. Also, each transmitter may transmit a unique ID in the transmitted packets, which will help discern between them in case multiple transmitters are received by the same receiver.

Figure 7:
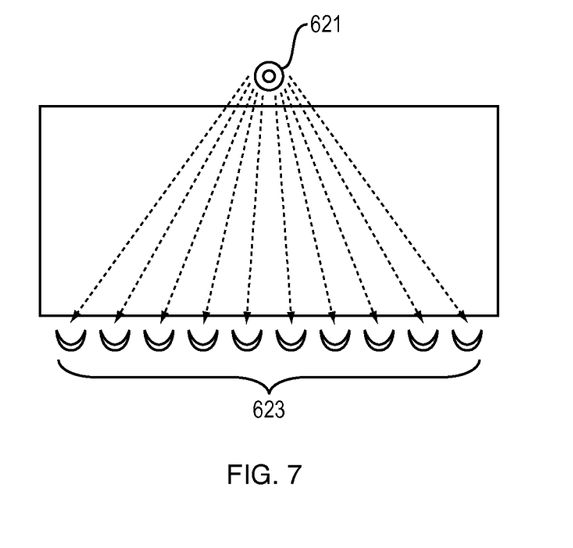
FIG. 7 shows a single omnidirectional transmitter transmitting to multiple directional receivers.

FIG. 7 shows a layout in which a single onmidirectional transmitter 621 transmits to multiple directional receivers 623, in an illustrative embodiment of this invention. Such a layout can save on hardware while still getting more detailed movement information than the single transmitter and single receiver deployment case.

In exemplary implementations of this invention, the algorithm used to process the signal uses a combination of traditional signal processing and pattern recognition. Transmissions received by the receiver are initially filtered in order to remove extraneous noise. Then changes in the signal strength are measured over time. Dramatic decreases in the signal strength can indicate that a body is passing between the transmitter and receiver. The total decrease in signal strength at any given moment can be used to estimate the number of people obstructing the signal. By monitoring both the decrease and increase in signal strength an accurate count of bodies can be maintained, as each passing body is associated with a consecutive decrease and increase.

In exemplary implementations, the algorithm identifies "events"—an event starts when the signal strength drops below a predefined threshold, and ends when the signal strength goes back up above the threshold. The baseline threshold is dynamically calibrated to the "neutral" signal strength of the system's deployment, without any object obstructing the path of the signal. However this baseline threshold can be recalculated at any time, to deal with situations where, for example, ambient RF noise level increases. While an event is ongoing, all measurements are aggregated in a buffer. Once the event is marked as over, the buffer is analyzed, and the detection results are reported.

Alternately, a threshold (baseline) RSS can be calibrated when organic tissue is present. In that case, changes in RSS from that baseline (up or down) can indicate movement of organic tissue and can trigger an "event".

In some implementations, the RSS can be processed in real time during an event in order to provide real time estimates, rather than storing data in a buffer until the end of the event.

Figure 8:
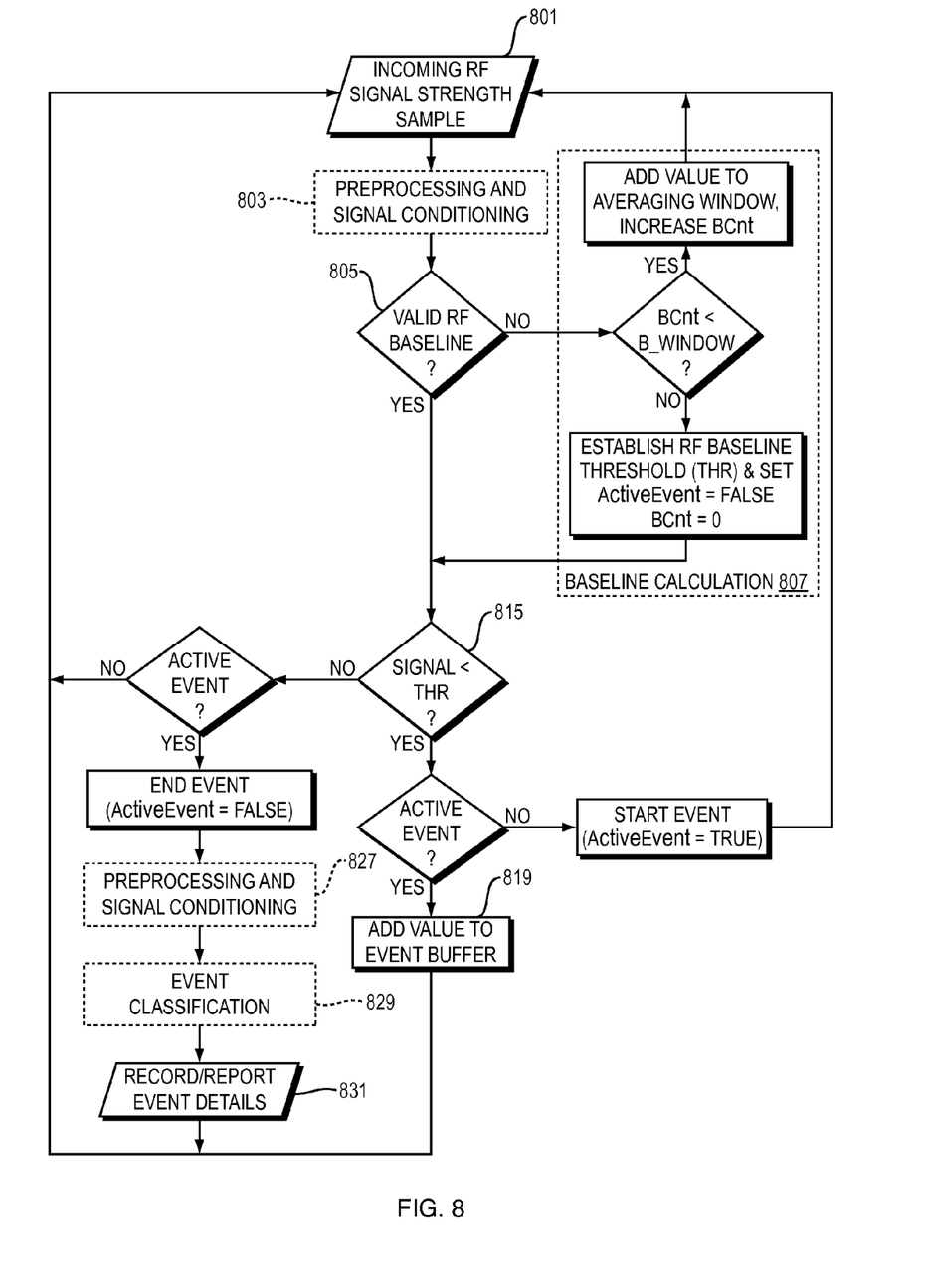
FIG. 8 is a high level flow chart for an algorithm to measure a reduction in received signal strength during an event that starts when RSS falls below a baseline and ends when RSS returns to the baseline.

FIG. 8 is a high-level flow chart for a data processing algorithm, in an illustrative embodiment of this invention. The algorithm is designed to run in an infinite loop. In this algorithm: A single measurement of signal strength 801 is given as input to the algorithm at each step. A module 803 performs a wide set of preprocessing and conditioning operations on the signal—e.g. signal clean-up, low-pass filters, normalization, scaling, and so on. These are standard common practice tools from the area of digital signal processing. The algorithm checks whether there is already an established and valid baseline 805. The system automatically calibrates to a "neutral" state of the environmental RF signal level at the measured frequency. This may take into account any ambient radio signals in the area that may offset the measurement. For baseline calculation, there is an assumption that no person or other measurable entity is present at the measurement area.

If a valid baseline threshold (THR) does not exist, the algorithm goes into the Baseline Calculation mode 807. A "baseline window" (B_WINDOW) is defined as the number of samples from which the baseline threshold will be calculated—for example 1000 samples. The algorithm accumulates B_WINDOW number of samples, and when that is reached, it calculates a baseline value.

The RF baseline threshold (THR) is the average value of the signal strength over the accumulated window coupled with a predefined sensitivity margin. Baseline is calculated at the startup of the system, and can also be re-calculated during its operation if the measured area is clear of organic tissue.

Once a valid threshold exists, any subsequent sample is compared to the threshold value 815. The system evaluates the data in batches of "events". An "event" starts when the measured signal strength goes below the THR threshold, and ends when the measured signal strength returns to be above the threshold. While an event is ongoing (ActiveEvent=true), all measurements are saved in a buffer (event buffer). 819

When the event ends, the buffered data is passed through a second stage of preprocessing and signal conditioning 827 to prepare the signal for the processing phase.

An event classification module 829 hosts a wide range of pattern recognition and classification operations. These may be general or tailored for specific deployment scenarios. For example, either model-based techniques (e.g. Bayes Decision Theory, Fischer Linear Discriminant, and Mixture models) or model-less techniques (e.g. Generalized Linear Discriminant) may be employed. The output of the classification stage depends on the goal of the deployment. When the goal is people-counting, the output will be the number of people crossing the measured threshold and associated parameters (or informing that no person was detected). The final stage 831 of the event processing phase is to report the output to any external client, and possibly save a log of the event data and processing steps.

The following is a description of a prototype of this invention:

The prototype is comprised of the following components: two development boards, two directional antennas, two tripods, a step attenuator and a laptop computer.

In this prototype, two development boards are used—one set up as transmitter, and the other as a receiver. For both boards, a PCB (printed circuit board) comprised of standard off-the-shelf components is used. Each PCB includes an ARM microcontroller (AT91SAM7S256), a 2.4 GHz radio transceiver (CC2500), a USB port for connecting to the PC (personal computer), and a power connection. The microcontroller acts as the main processing unit and is able to send and receive packets through via the transceiver, and to relay the received packets through the USB port. The board can be powered by battery or via the USB port.

In this prototype, the two antennas are 2.4 GHz directional antennas. Different beam widths were tested in this prototype. In some cases, 30-degree beamwidth antennas were used, in other cases 12-degree beamwidth antennas were used.

One antenna is connected to the receiver and the other to the transmitter. Combinations of both antenna types (12-degree beamwidth and 30-degree beamwidth) were successful. For the majority of tests of the prototype, the goal was to create as narrow beam as possible, and so in most tests the 12-degree antennas were used for both sides of the transmission. In the distances tested with the prototype, beam width was set to approximately 12 inches.

In this prototype, two tripods are used. Each antenna is connected to a tripod so its height and orientation can be controlled.

In this prototype, a step attenuator is connected on the receiver side, between the antenna and the transceiver, and is used to reduce signal strength before transmission through the antenna. Software is installed on the laptop. The software can receive data from the receiver development board through the USB port, and run the system's detection algorithm as described above.

In this prototype, both antennas are fastened to a tripod, and set up facing one another, so that their feeds are 10 ft. apart. The height of the antenna feed is approximately 90 cm-140 cm above the ground, so that the center of the beam passes across the middle-section of a typical adult human (belly area).

On the transmitter side of this prototype, the antenna is connected to the attenuator. Then attenuator is connected to the antenna connector of the transmitter development board. That board, in turn, is connected to a transceiver chip. The microprocessor instructs the transceiver to send "ping" packets, in its lowest power level. The payload of the packet can be empty or meaningful data—this does not matter for the sensor implementation. Transmission frequency can vary and control the resolution of the sensor. For the most part, values of 100 and 1000 packets per second were tested.

On the receiver side of this prototype, the receiver is set up in a constant receive loop, attempting to extract packets from the RF signal. For each received packet the transceiver also provides its received signal strength (RSSI) value, in a range between of 0-128. For every received packet, the microprocessor relays its payload, timestamp, and RSSI value to the connected computer.

In this prototype, without an attenuator, even the lowest power level of the transmitter would be received with such high signal strength that the receiver would be saturated around the maximal RSSI value even when a person passed through the sensor. To avoid this saturation, an attenuator is used in the prototype to reduce the transmitted signal strength to a level that brings the signal down to a usable range. The signal strength range is a result of many factors—including distance between the transmitter and receiver, the antenna type, and background RF noise. (Alternately, a lower power transmitter can be used, thereby eliminating the need for an attenuator).

In this prototype, pattern recognition algorithms are trained as follows: Data is collected from a large set of controlled scenarios that can be tagged with the "correct" answer. For example, measurements are made of a single person passing crossing the signal threshold (for many different people and the same person multiple times). Additionally, measurements of multiple people in different configurations of number of people, speed of movement, and spatial configuration of the group may be made. This dataset is later used to train pattern recognition algorithms.

In this prototype, the event classification module is flexible and different algorithms can be used.

Prior to the event classification module, the signal has undergone a clean-up and "smoothening" process, based on a low-pass filter. In many cases, it is desirable to use the smoothened signal for event classification.

In exemplary implementations of this invention, a signal feature that can be significant for the detection process is the summation of the total degradation of the RF signal during the measured event (the "sum_degradation").

Figure 9:
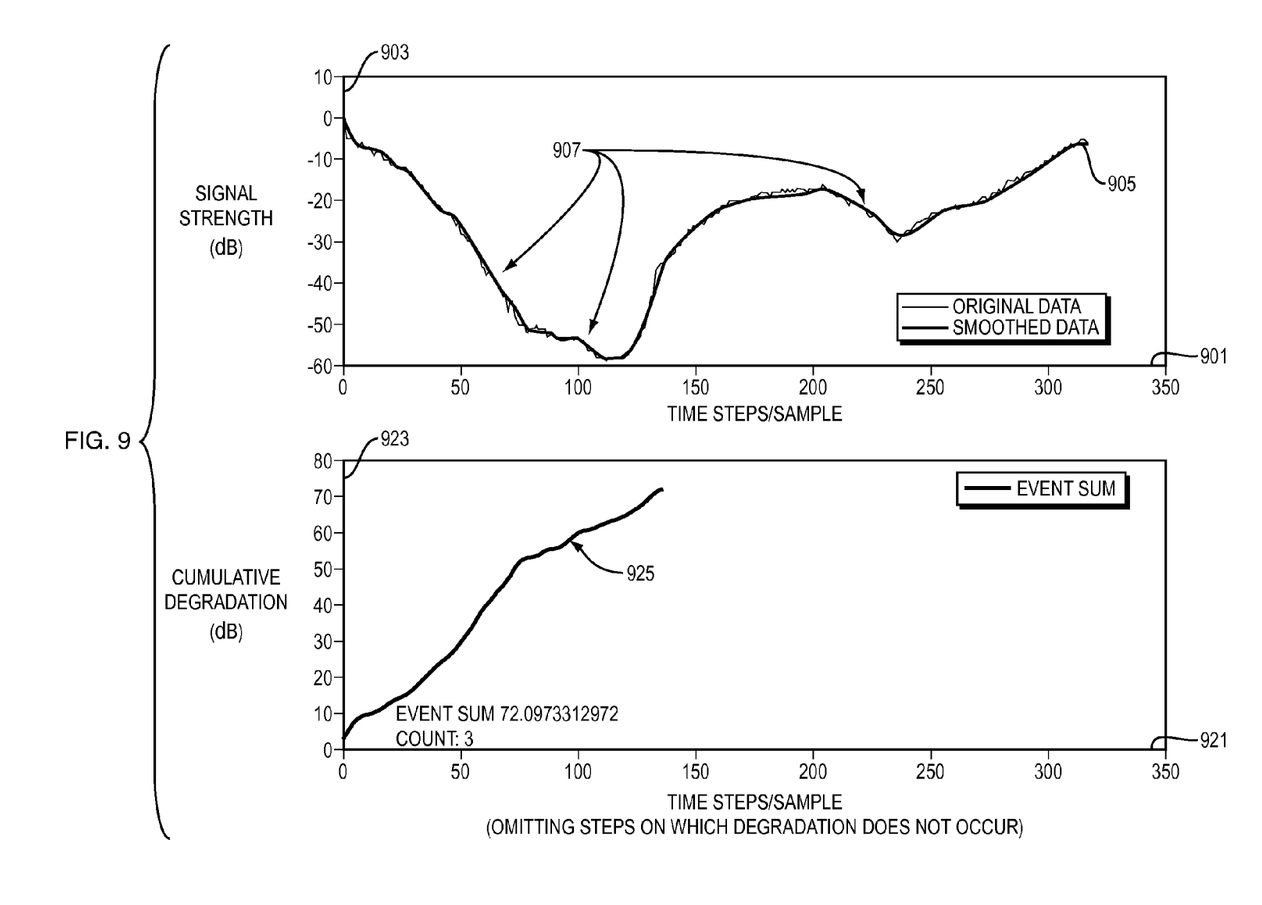
FIGS. 9 and 10 each comprise two charts, the top chart being a plot of reduction of signal strength during an event and the bottom chart being a plot of the summation of total reduction during that event.

FIG. 9 shows an example of the summing up of the signal degradation. The top chart in FIG. 9 shows the event data as it was measured from start to finish. Every time that sample at time t is lower than the previous sample (t−1), the difference is added to the sum_degradation count. In the top chart, arrows point to the main areas of signal degradation. The bottom chart in FIG. 9 shows the summed up signal. At the bottom left corner of the bottom figure is the actual summed value, and the estimated person count (3 in this case).

In some implementations, other features can also be used by a detection algorithm. For example, any of the following features may be used: (a) average signal strength baseline (a given baseline might add a scaling factor to the estimation function), (b) event duration, (c) number of event samples, (d) ratio between number of samples and duration, (e) other functions of the sum_degradation value (e.g. exponent or logarithm), or (f) other features that remain constant throughout the sampling (e.g. distance between antennas).

In some implementations, a detection algorithm may focus on other factors that change during sampling. For example, a change in baseline levels in between samples may be used as an indicator (e.g., an unstable baseline may be an indication of a large crowed in the area).

In some implementations, a mobile device carried or worn a person may run an app for communicating with this invention. A transceiver (e.g., a Bluetooth® transceiver) in the mobile device may transmit data, which data is received by the present invention as the person approaches or passes the threshold. The data transmitted may identify the person or communicate other information.

Figure 10:
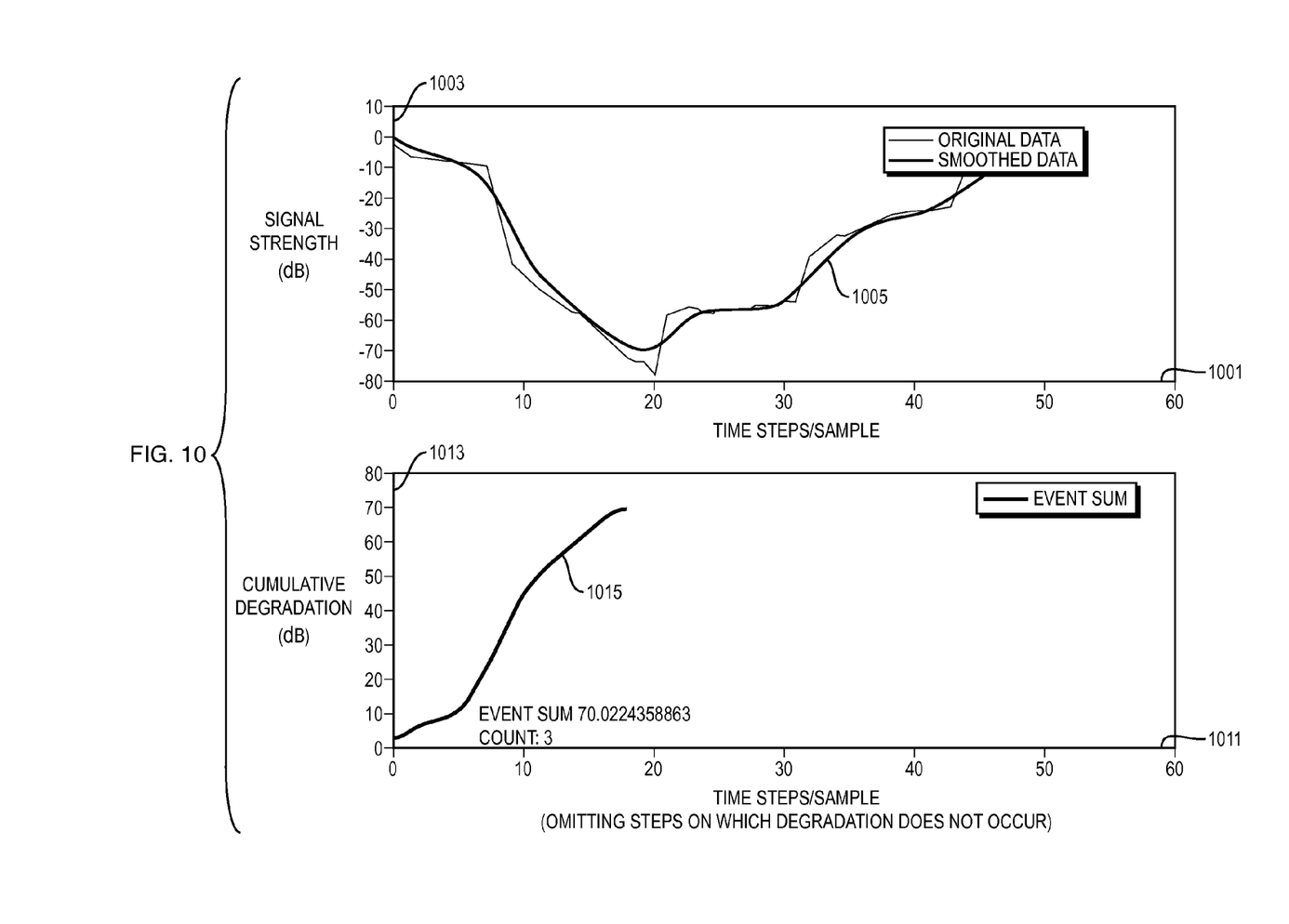
Figure 11:
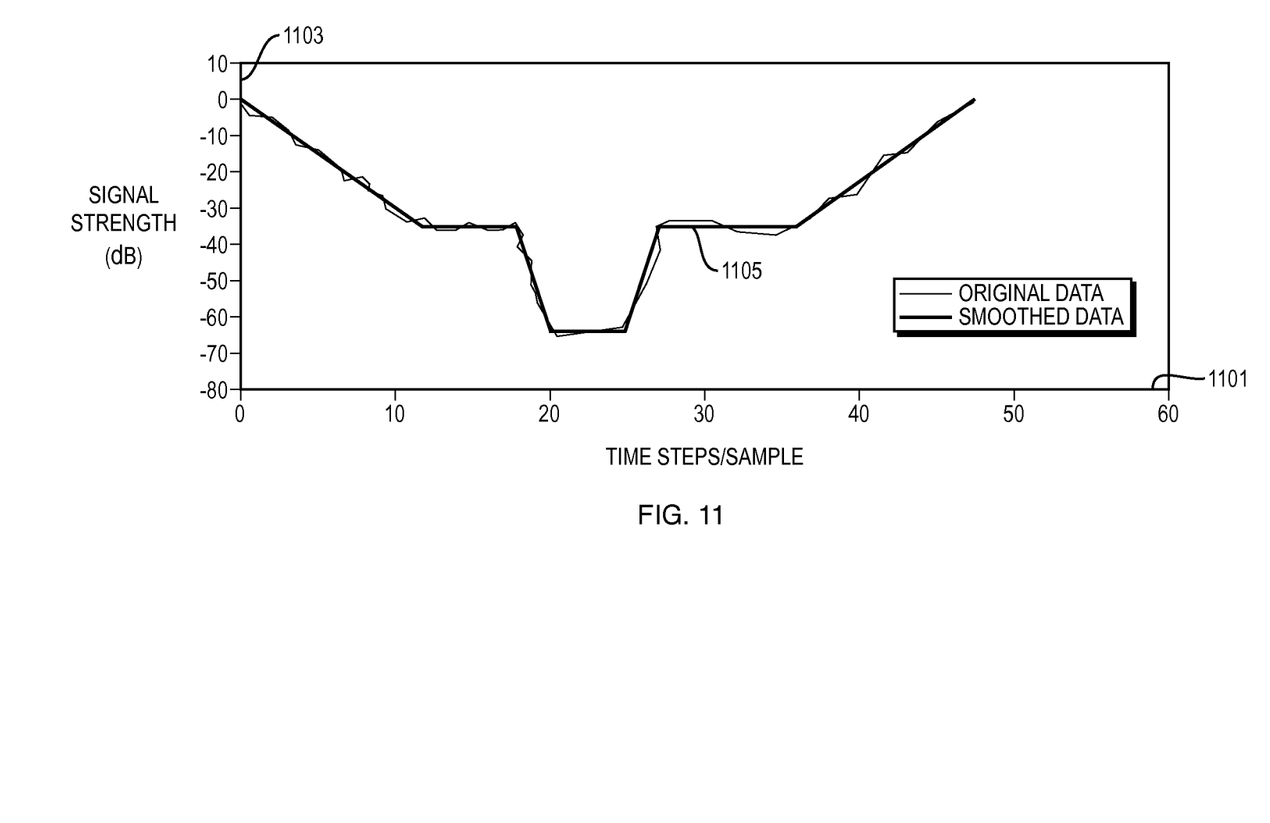
FIG. 11 is a chart that shows reduction in signal strength.

In some implementations, this invention can not only detect the number of bodies passing through a threshold, but also extract other information. For example, when looking at the event measurement image through the naked eye, different reverse "peaks" and step-like shapes can be seen in the signal. FIG. 10 shows an example of these step-like artifacts. In some cases, the peaks and steps can be correlated to the number of people, and also to other characteristics of the measured scenario. For example, one person walking slowly while another person comes from behind, walking in a faster speed through the measured physical boundary may look roughly like the shape shown in FIG. 11. Thus, standard techniques from computer graphics, such as peak detection and shape matching, can be used to further improve the performance of the system In all of the charts in FIGS. 9, 10 and 11, the horizontal axis 901, 921, 1001, 1011 and 1101 is time or number of samples. In the top charts in FIGS. 9, 10 and 11, the vertical axis 903, 1003, 1103 is the received signal strength. These top charts show plots of both the smoothed data 905, 1005, 1105 and original data. In the bottom charts of FIGS. 9, 10 and 11, the vertical axis 923, 1013, 1103 is sum_degradation (the summation of the total degradation of the RF signal during the measured event), and sum_degradation is plotted 925, 1015, 1105. Of course, FIGS. 9, 10 and 11 show only illustrative examples; the actual measurements may vary widely.

Variations

This invention is not limited to the prototype, but can be implemented in many other ways. Here are some non-limiting examples:

Different size antennas may be used, such as flat-panel directional antennas, or a fabricated micro-strip patch array, that have smaller form factors. Different types of directional antennas (also known as high-gain antennas) may be employed, such as, for example, an AWX antenna, Beverage antenna, cantenna, fractal antenna, ground dipole, helical antenna, horizontal curtain, horn, inverted vee antenna, log-periodic antenna, loop antenna, microstrip antenna, patch antenna, phased array, parabolic antenna, plasma antenna, quad antenna, reflective array antenna, regenerative loop antenna, rhombic antenna, sector antenna, short backfire antenna, slot antenna, turnstile antenna, Vivaldi antenna, or a Yagi-Uda antenna.

Depending of the particular implementation, the directivity of a directional antenna or omnidirectional antenna employed in this invention may vary. For example, a directional antenna used in this invention may have a directivity of at least 5 dBi, at least 6 dBi, at least 8 dBi, at least 10 dBi, at least 15 dBi, at least 20 dBi, at least 30 dBi, or at least 40 dBi. Or, for example, an omnidirectional antenna used in this invention may have a directivity of less than 2.5 dBi, or less than 2 dBi.

Likewise, depending on the particular implementation, the gain of a directional antenna or omnidirectional antenna employed in this invention may vary. For example, a directional antenna used in this invention may have a gain of at least 5 dBi, at least 6 dBi, at least 8 dBi, at least 10 dBi, at least 15 dBi, at least 20 dBi, at least 30 dBi, or at least 40 dBi. Or, for example, an omnidirectional antenna used in this invention may have a gain of less than 2.5 dBi, less than 2 dBi, or less than 1 dBi.

The radio frequency can be different than 2.4 GHz (for example in the 5 GHz band). Different transceivers may be used (including standard communication transceivers such as Bluetooth®, Zigbee®, and WLAN). The distance between antennas can be smaller or greater as desired. Other antenna configurations and layouts may be used, including combinations of directional and omnidirectional, as well as setups of multiple sensed thresholds. Rather than using an antenna height that aims a directional signal at the center of mass of the person, alternative heights are possible. For instance, height could be lower, for example around 50 cm, where the antenna will cross an average adult person's legs. The system could be completely battery operated. The algorithm functions of the attached laptop computer could be moved into the microprocessor. The measurements may be analyzed in batches, processing an event's collected buffer of measurements once the event is over. Alternately, the system may analyze samples serially, as they come in, and continuously report the status of the signal. This is desirable for cases when there are very long "events", such as people standing in front of the sensor for long times, where real-time reports are desired. Multiple processors may be employed (all or some of which may be remote from other hardware used in the invention), and computation may be divided among these processors in different ways.

This invention has many practical applications and advantages. Depending on the particular implementation, this invention may have any of the following applications: (a) to measure the movement and presence of mammals and other living animals, (b) for motion detection and "virtual fencing" systems, (c) in a low traffic doorway or other threshold), (d) at a high traffic threshold (such as the entrance to an airport or shopping mall), (e) in outdoor settings (the RF signal is impervious to light and outdoor temperatures), (f) tracking through walls (such as behind a store's wall or even inside the wall), (g) long term installations, such as on a city street to measure pedestrian traffic, or at the entrance of an outdoor concert venue, and (h) temporary installations.

Temporary installations can be quite useful. In exemplary implementations, this invention is easy to use, and has a small form factor and low power consumption, making it well-suited for temporary deployment. For example, police may use it to quickly gauge crowd size. Or, for example, soldiers may temporarily install it to monitor a perimeter around a camp site or other area, or to monitor a particular passageway.

Some deployments of this invention, such as arrays of sensors, can allow for accurate indoor and outdoor positioning of people, without the need for them to carry any other object on their person. Other configurations allow for detecting position and movement of specific parts of a person, such as hands or legs.

Because the communication and sensing can be coupled, this invention is well suited to applications involving remote communication. For example, data can be reported back to a central location, where it can be viewed or processed by the user. Other deployment configurations for this invention may be used. For example, the devices might be deployed throughout a large store or city in order to measure traffic (of human bodies) at many locations. The distributed group of devices may form an ad-hoc network, enabling communication without an existing communications infrastructure. Alternately, the sensor data may be "piggybacked" on user data communication, and one of the sensor ends might be a standard commercial Wireless LAN access point.

This invention may be implemented as a method comprising: (a) transmitting radio signals from a first antenna to a second antenna, at least one of the first and second antennas being a directional antenna, and (b) processing data regarding received signal strength of the radio signals to determine the position, velocity or number of one or more bodies that are between or that cross between the first and second antennas. Furthermore: (1) the first antenna may be a directional antenna; (2) the second antenna may be a directional antenna; (3) the processing of data may include the step of recognizing an event that starts when received signal strength at the second antenna falls below a baseline and that ends when received signal strength at the second antenna returns to the baseline; (4) the processing of data may further comprise the steps of: calculating sum_degradation as of different times during the event, recognizing a pattern in how the sum_degradation changes during the event, and based on at least in part on the pattern that is recognized, determining the position, velocity or number of the one or more bodies; (5) the processing of data may further comprise the steps of recognizing a pattern in how received signal strength changes during an event, and based at least in part on the pattern that is recognized, determining that, during at least part of the event, a body is located between the first and second antennas and is not moving; (6) the radio signals may be received by a plurality of antennas, including the second antenna, and the data that is processed may include received signal strength of each of the plurality of antennas, respectively; (7) the first and second antennas may be members of a set of antennas, which set comprises at least three antennas, wherein a subset comprises all or part of the set of the antennas, each member of the subset is a directional antenna, each member of the subset has a direction of peak power gain, and said direction of peak power gain has a projection on a reference plane, which reference plane is a plane that intersects all of the directional antennas in the subset or that intersects the maximum number of directional antennas in the subset that any plane intersects, and the projections on the reference plane may intersect each other at angles; (8) at least some of the angles may each be greater than 85 degrees; (9) at least some of the angles may be less than 70 degrees; (10) the radio signals may have a frequency that is more than 2.3 GHz and less than 2.5 GHz; (11) the radio signals may have a frequency that is more than 4.9 GHz and less than 5.1 GHz; (12) the first and second antennas may be positioned at a first and second height, respectively, above the surface on which the bodies are walking or standing, and the first and second heights may each be less than 145 centimeters and more than 85 centimeters; and (13) the first and second antennas may each transmit and receive signals.

This invention may be implemented as apparatus comprising, in combination: (a) a transmitter for transmitting radio signals, which transmitter includes a first antenna, (b) a receiver for receiving the radio signals, which receiver includes a second antenna, at least one of the first and second antennas being a directional antenna, and (c) at least one processor for processing data regarding the received signal strength of the radio signals received by the receiver and determining, based on that data, the number of the bodies that move past a threshold. Furthermore: (1) the bodies may comprise human bodies; and (2) the apparatus may further comprise an attenuator for reducing signal strength of the radio signals transmitted by the transmitter This invention may be invented as apparatus comprising: (a) a first transmitter for transmitting radio signals, (b) a first receiver for receiving the radio signals and outputting electrical signals, (c) a signal conditioning module for accepting the electrical signals and for outputting conditioned signals, and (d) at least one processor for processing the conditioned signals to determine reduction in received signal strength of the radio signals relative to a baseline, and based on the reduction, determining the position, velocity or number of one or more bodies that are between, or cross between, the first and second antennas, wherein the first transmitter includes a first antenna and the first receiver includes a second antenna, and at least one of the first or second antennas is a directional antenna. Furthermore: (1) the at least one processor may comprise more than one processors, at least one of which is remote from both the first transmitter and the first receiver; and (2) the apparatus may further comprise other receivers for receiving the radio signals, each of which other receivers has an antenna, wherein the data that the at least one processor is adapted to process includes received signal strength of each antenna of the other receivers, respectively, and either the first antenna is a directional antenna or the second antenna and each antenna of the other receivers are directional antennas.

Definitions and Clarifications

Here are a few definitions and clarifications of terms. As used herein:

The article "a" (or "an"), when used with respect to a thing, does not imply that there is only one of the thing.

"Body" means a human or animal body.

"Directivity" means peak directivity.

"Gain" of an antenna means the peak net power gain of the antenna.

The terms "include", "includes", "including" and grammatical variations thereof shall be construed broadly, as if followed by the words "without limitation".

The term "or" is an inclusive disjunctive. For example "A or B" is true if A is true, or B is true, or both A or B are true.

The term "receiver" includes a transceiver.

"RSS" means received signal strength.

"Sum_degradation" as of a particular time during an event means the cumulative (as of that time) sum of reductions in RSS below a baseline RSS during the event, or a logarithm or exponential of that cumulative sum of reductions.

"Tissue" means organic tissue comprising part of a body.

The term "transmitter" includes a transceiver.

Conclusion

It is to be understood that the methods and apparatus which have been described above are merely illustrative applications of the principles of the invention. Numerous modifications may be made by those skilled in the art without departing from the scope of the invention. The scope of the invention is not to be limited except by the claims that follow.

What is claimed is:

1. A method comprising:
   (a) transmitting radio signals from a first antenna to a second antenna, at least one of the first and second antennas being a directional antenna; and
   (b) processing data regarding received signal strength of the radio signals to determine the position, velocity or number of one or more bodies that are between or that cross between the first and second antennas;
   wherein the processing includes:
      (i) determining a temporal duration of reduction in the received signal strength of the radio signals from the first antenna to the second antenna; and
      (ii) using the temporal duration in order to calculate the velocity.

2. The method of claim 1, wherein the first antenna is a directional antenna.

3. The method of claim 1, wherein the second antenna is a directional antenna.

4. The method of claim 1, wherein the processing of data includes the step of recognizing an event that starts when received signal strength at the second antenna falls below a baseline and that ends when received signal strength at the second antenna returns to the baseline.

5. The method of claim 4, wherein the processing of data further comprises the steps of:
   calculating sum degradation as of different times during the event,
   recognizing a pattern in how the sum degradation changes during the event, and
   based on at least in part on the pattern that is recognized, determining the position, velocity or number of the one or more bodies.

6. The method of claim 1, wherein the reduction in received signal strength is due to a spine passing between the first antenna and second antenna.

7. The method of claim 1, wherein the radio signals are received by a plurality of antennas, including the second antenna, and the data that is processed includes received signal strength of each of the plurality of antennas, respectively.

8. The method of claim 1, wherein:
   the first and second antennas are members of a set of antennas, which set comprises at least three antennas,
   a subset comprises all or part of the set of the antennas, each member of the subset is a directional antenna, each member of the subset has a direction of peak power gain, and said direction of peak power gain has a projection on a reference plane, which reference plane is a plane that intersects all of the directional antennas in the subset or that intersects the maximum number of directional antennas in the subset that any plane intersects, and
   the projections on the reference plane intersect each other at angles.

9. The method of claim 8, wherein at least some of the angles, respectively, are greater than 85 degrees.

10. The method of claim 8, wherein at least some of the angles, respectively, are less than 70 degrees.

11. The method of claim 1, wherein the radio signals have a frequency that is more than 2.3 GHz and less than 2.5 GHz.

12. The method of claim 1, wherein the radio signals have a frequency that is more than 4.9 GHz and less than 5.1 GHz.

13. The method of claim 1, wherein
the first and second antennas are positioned at a first and second height, respectively, above the surface on which the bodies are walking or standing, and
the first and second heights are each less than 145 centimeters and more than 85 centimeters.

14. The method of claim 1, wherein the first and second antennas each transmit and receive signals.

15. Apparatus comprising, in combination:
(a) a transmitter antenna for transmitting radio signals, which transmitter antenna is a directional antenna;
(b) a receiver antenna for receiving the radio signals; and
(c) at least one processor for processing data regarding the received signal strength of the radio signals received by the receiver antenna from the transmitter antenna and determining, based on that data, the number and velocity of the bodies that move past a threshold.

16. The apparatus of claim 15, wherein the processing includes:
(a) determining a temporal duration of reduction in the received signal strength of the radio signals from the transmitter antenna to the receiver antenna; and
(b) using the temporal duration in order to calculate the velocity.

17. The apparatus of claim 15, further comprising an attenuator for reducing signal strength of the radio signals transmitted by the transmitter.

18. Apparatus comprising
(a) a first transmitter for transmitting radio signals;
(b) a first receiver for receiving the radio signals and outputting electrical signals;
(c) a signal conditioning module for accepting the electrical signals and for outputting conditioned signals; and
(d) at least one processor for
(i) processing the conditioned signals to determine reduction in received signal strength of the radio signals relative to a baseline, and
(ii) based on the reduction, determining the velocity of one or more bodies that cross between the first and second antennas;
wherein the first transmitter includes a first antenna and the first receiver includes a second antenna, and at least one of the first or second antennas is a directional antenna.

19. The apparatus of claim 18, wherein the processing includes determining a temporal duration of the reduction in received signal strength.

20. The apparatus of claim 18, wherein the first antenna is directional.

\* \* \* \* \*